(12) United States Patent
Zhang

(10) Patent No.: US 12,472,883 B2
(45) Date of Patent: Nov. 18, 2025

(54) VEHICLE TRUNK MAT WITH LIMIT DEVICE FOR LUGGAGE

(71) Applicant: JIANGYIN ZHOUZHUANG FENGYUAN PLASTIC CO., LTD., Jiangsu (CN)

(72) Inventor: Yuansheng Zhang, Jiangsu (CN)

(73) Assignee: JIANGYIN ZHOUZHUANG FENGYUAN PLASTIC CO., LTD., Jiangsu (CN)

( * ) Notice: Subject to any disclaimer, the term of this patent is extended or adjusted under 35 U.S.C. 154(b) by 371 days.

(21) Appl. No.: 18/229,521

(22) Filed: Aug. 2, 2023

(65) Prior Publication Data

US 2024/0359638 A1 Oct. 31, 2024

Related U.S. Application Data

(63) Continuation of application No. PCT/CN2023/097117, filed on May 30, 2023.

(30) Foreign Application Priority Data

Apr. 25, 2023 (CN) .......................... 202310459259.1

(51) Int. Cl.
*B60R 13/01* (2006.01)
*B60P 7/08* (2006.01)
(Continued)

(52) U.S. Cl.
CPC .......... *B60R 13/011* (2013.01); *B60P 7/0892* (2013.01); *B60P 7/10* (2013.01); *B60P 7/15* (2013.01); *B60R 2013/016* (2013.01)

(58) Field of Classification Search
CPC ............. B60R 13/011; B60R 2013/016; B60P 7/0892; B60P 7/10; B60P 7/15; B60P 7/0815
See application file for complete search history.

(56) References Cited

U.S. PATENT DOCUMENTS

2009/0169322 A1\* 7/2009 Aro .......................... B60R 7/02
                                                              410/102
2022/0219762 A1    7/2022 Jankowski et al.

FOREIGN PATENT DOCUMENTS

CN          205220526 U    5/2016
CN          210315493 U    4/2020
(Continued)

OTHER PUBLICATIONS

International Search Report of Corresponding Application PCT/CN2023/097117, mailed Jan. 12, 2024, 5 pages.
(Continued)

*Primary Examiner* — Daniel J Colilla
(74) *Attorney, Agent, or Firm* — Cooper Legal Group, LLC

(57) ABSTRACT

The present application relates to the technical field of loading luggage in a vehicle trunk, and particularly to a vehicle trunk mat with limit device for luggage including a luggage mat; a sliding rail fastened on the luggage mat, and a support rod slidably connected to the sliding rail, the support rod is perpendicular to the luggage mat. A lifting rod is slidably arranged in the support rod, an end of the lifting rod is fastened with a limit block. The sliding rail is configured with a plurality of limit grooves. When the limit block is inserted into the limit groove, the support rod is locked. A top of the support rod is slidably connected with a pressing block, a height switching assembly is connected between the pressing block and the lifting rod, the height switching assembly is adaptive for switching different height positions of the lifting rod.

10 Claims, 12 Drawing Sheets

(51) Int. Cl.
*B60P 7/10* (2006.01)
*B60P 7/15* (2006.01)

(56) References Cited

FOREIGN PATENT DOCUMENTS

| | | | |
|---|---|---|---|
| CN | 215154316 U | 12/2021 | |
| CN | 215361178 U | 12/2021 | |
| CN | 218085366 U | 12/2022 | |
| CN | 218400425 U | 1/2023 | |
| CN | 219857030 U | 10/2023 | |
| DE | 19518432 A1 * | 11/1996 | ............... B60R 5/04 |
| DE | 10134887 B4 * | 1/2006 | ............ B60P 7/0892 |
| FR | 2934221 A3 | 1/2010 | |

OTHER PUBLICATIONS

First Office Action cited in Corresponding Chinese patent Application No. 202310459259.1, dated Jan. 10, 2024, 12 pages.

* cited by examiner

VEHICLE TRUNK MAT WITH LIMIT DEVICE FOR LUGGAGE

CROSS-REFERENCE TO RELATED APPLICATION

This application is a continuation of PCT application serial no. PCT/CN2023/097117, filed on May 30, 2023, which claims the priority and benefit of Chinese patent application serial no. 202310459259.1, field on Apr. 25, 2023. The entireties of PCT application serial no. PCT/CN2023/097117 and Chinese patent application serial no. 202310459259.1 are hereby incorporated by reference herein and made a part of this specification.

TECHNICAL FIELD

The present application relates to the technical field of loading luggage in a vehicle trunk, and, particularly to a vehicle trunk mat with limit device for luggage.

BACKGROUND ART

A vehicle trunk is usually used for loading a luggage, however, since the vehicle trunk has a relative large space, the luggage in the vehicle trunk tends to shake or even topple over by a sudden braking or accelerating.

In related technology, a Chinese patent application with a publication no. of CN218085366U disclosed a vehicle trunk mat with a luggage box fixing device. In order to solve a problem that the luggage is easy to topple over, the trunk mat is provided with two sliding rails parallel to each other. Each sliding rail is slidably provided with a sliding base, and a limit rod is connected between the two sliding bases. The luggage in the trunk can be limited and fixed via the limit rod, to prevent the luggage from toppling over as much as possible.

The above sliding base includes a base and a connecting rod, a stopper is connected between the sliding base and the sliding rail. The sliding base can be unlocked by the stopper through pressing the connecting rod, while the connecting rod is released, such that the connecting rod can be restored via an elastic component, thereby locking the sliding base. Therefore, when the position of the limit rod is to be adjusted depending on the size of the luggage, the two connecting rods must always be pressed, such that the sliding seat can be pushed to move, which results in an inconvenient operation.

SUMMARY

In order to improve the convenience for adjusting a position of a limit rod, a vehicle trunk mat with limit device for luggage is disclosed.

By the vehicle trunk mat with limit device for luggage disclosed is the following technical solution used:
the vehicle trunk mat with limit device for luggage, including:
a luggage mat configured for lying in a vehicle trunk;
a sliding rail fastened on the luggage mat, the sliding rail is configured with a plurality of limit grooves spaced apart from each other;
a support rod slidably connected to the sliding rail, the support rod is perpendicular to the luggage mat and is connected with a limit rod paralleled with the luggage mat, the limit rod is spaced from the luggage mat at a distance, a lifting rod extends slidably in the support rod, a first end of the lifting rod facing to the sliding rail is fastened with a limit block, and a second end of the support rod departing from the sliding rail is provided with a pressing block; and
a height switching assembly connected between the pressing block and the lifting rod, when the pressing block is pressed, the height switching assembly is adaptive for switching different height positions of the lifting rod, so that the limit block is inserted into or detached from the limit groove.

By adopting the above technical solution, the limit block is positioned in the limit groove in a primary state, thereby locking the position of the support rod.

When the position of the limit rod is to be adjusted depending on the size of the luggage in the vehicle trunk, the pressing block is pressed downward to drive the lifting rod to move downward via the height switching assembly, such that the lifting rod is locked. During the downward movement of the lifting rod, the limit block is driven to move downward to detach from the limit groove, thereby unlocking the support rod.

Then, the support rod is pushed along the sliding rail after releasing the pressing block, and the support rod drives the limit rod to move, so that the pressing block mustn't always be pressed during adjusting the limit rod, which improves the convenience for adjusting the position of the limit rod.

When the limit rod is adjusted to a designated position, the pressing block is pressed again to drive the lifting rod to rise via the height switching assembly, and the lifting rod is locked, so that the limit block moves in the limit groove again, thereby the support rod is locked.

By adopting the above technical solution, the support rod, the pressing block and the height switching assembly are cooperated with each other, which improves the convenience for adjusting the position of the limit rod.

Optionally, the height switching assembly includes a linkage sleeved on the lifting rod, the linkage is positioned between the pressing block and the lifting rod, the linkage can rotate relative to the lifting rod, an outer circumferential wall of the linkage is fixedly connected with a plurality of bumps arranged at intervals, and an end of each of the bumps facing to the pressing block has an abutting helicoid;
a top of the support rod is fastened with a plurality of first limit boards and a plurality of second limit boards, the first limit boards and the second limit boards are alternately arranged in a circumferential direction of the linkage; an end of each of the plurality of first limit boards facing to the lifting rod is configured with a first limit helicoid, an end of each of the plurality of second limit boards facing to the lifting rod is configured with a second limit helicoid, a top end of the first limit helicoid is higher than that of the second limit helicoid, the abutting helicoid can fit into the first limit helicoid or the second limit helicoid; a slideway parallel to an axis of the lifting rod is formed between each of the plurality of first limit boards and a respective one of the plurality of second limit boards, a driving block is provided in each of the plurality of slideways, the plurality of driving blocks are fastened at a bottom of the pressing block, and each of the plurality of driving blocks is adaptive for pushing the abutting helicoid; and
an elastic jacking component for driving the lifting rod to move upward is provided at a bottom of the support rod.

By adopting the above technical solution, the abutting helicoid of the bump abuts against the first limit helicoid in the primary state, so that the lifting rod is at a high position, and the limit block is located in the limit groove, so that the support rod is in a locking state.

When the support rod is to be unlocked, the pressing block is pressed downward to drive the driving block to descend. When the driving block abuts against the abutting helicoid, the bump is driven to descend, wherein the bump moves downward under limitation of the sidewall of the second limit board and drives the linkage to move downward. When the bump is detached from the second limit board, the linkage rotates due to a continuous downward pushing force of the driving block. Meanwhile the pressing block is pulled upward, such that the driving block cannot interfere the movement of the bump. The bump on the linkage fits into the second limit helicoid and slides upward along the second limit helicoid under the elastic jacking component, and the bump drives the linkage to slide upward and rotate, till the bump abuts against a sidewall of the first limit board. At this moment, the linkage is at a low position, thereby the lifting rod is at the low position, so that the limit block is detached from the limit groove to unlock the support rod.

When the support rod is to be locked again, the pressing block is pressed downward again to drive the driving block to descend. When the driving block abuts against the abutting helicoid, the bump is driven to descend, wherein the bump moves downward under imitation of the sidewall of the first limit board and drives the linkage to move downward. When the bump is detached from the first limit board, the linkage rotates due to the continuous downward pushing force of the driving block. Then, the pressing block is pulled upward, the bump on the linkage fits into the second limit helicoid and slides upward along the second limit helicoid under the elastic jacking component, and the bump drives the linkage to slide upward and rotate, till the bump abuts against the sidewall of the second limit board. At this moment, the linkage is at the high position, thereby the lifting rod is at the high position, so that the limit block is inserted into the limit groove to lock the support rod again.

Optionally, an elastic reset component is connected between the lifting rod and the pressing block, and the elastic reset component is adaptive for driving the pressing block to move in a direction departing from the lifting rod.

The pressing block must be pulled manually, such that the driving block wouldn't interfere the movement path of the bump after pressing the pressing block every time, when no elastic reset component is provided. The pressing block can restore upward with the elastic reset component after pressing the pressing block every time, which is convenient to operate.

Optionally, the top of the support rod is detachably connected with a sealing cover, the pressing block extends slidably through the sealing cover, and the plurality of first limit boards and the plurality of second limit boards are fixedly connected to the sealing cover.

By adopting the above technical solution, the pressing bock, the first limit board, the second limit board and the linkage can be detached conveniently.

Optionally, the vehicle trunk mat also includes:
 a reinforcing rod configured as a telescopic rod, the reinforcing rod is connected with an elastic driving component for driving the reinforcing rod to elongate, a first end of the reinforcing rod is configured as a fixing end and fixedly connected to the support rod, while a second end of the reinforcing rod is configured as a movable end; when the limit block is located in the limit groove, the movable end abuts against the sliding rail by an elastic force of the elastic driving component; and
 a transmission assembly connected between the lifting rod and the reinforcing rod, when the lifting rod descends, the transmission assembly drives the reinforcing rod to shorten, so that the reinforcing rod is detached from the sliding rail.

The support rod is relative high, which result in its higher center of gravity, so that the support rod tends to deform when it bears a pushing force from the luggage. However, if a triangular structure is formed by the reinforcing rod, the sliding rail and the support rod by providing the reinforcing rod, so that the bottom of the support rod is reinforced, the reinforcing rod will seriously affect the sliding of the support rod, thereby the reinforcing rod and the transmission assembly are provided to solve above problem.

The limit block is positioned in the limit groove to lock the support rod in the primary state, wherein the reinforcing rod abuts against the sliding rail under the elastic driving component to improve the strength of a connection portion of the reinforcing rod and the sliding rail.

When the position of the limit rod needs to be adjusted, the pressing block is pressed downward to drive the lifting rod to move downward via the height switching assembly, and the reinforcing rod is shortened by the lifting rod via the transmission assembly, so that the movable end of the reinforcing rod is detached from the sliding rail.

Next, the pressing block is released to push the support rod to slide along the sliding rail, the support rod drives the limit rod to move. Therefore, the reinforcing rod doesn't tend to affect the movement of the support rod during adjusting the limit rod, so that the support rod can slide smoothly.

When the limit rod is adjusted to the designated position, the pressing block is pressed to drive the lifting rod to rise via the height switching assembly. During the rising of the lifting rod, the transmission assembly and the elastic driving component are cooperated with each other, such that the reinforcing rod is elongated, and the movable end of the reinforcing rod abuts against the sliding rail under the elastic driving component, which improves the strength of a connection portion of the support rod and the sliding rail as well as the stability of the whole limit device for luggage.

By adopting the above technical solution, not only the stability of the whole limit device for luggage is ensured, but also the convenience for adjusting the position of the limit rod is improved through the cooperation between the support rod, the transmission assembly and the reinforcing rod.

Optionally, the transmission assembly includes a wire wheel and a rope, the wire wheel is rotationally arranged in the support rod, the rope is wound around the wire wheel, a first end of the rope is fixedly connected to the lifting rod, while a second end of the rope is fixedly connected to the movable end of the reinforcing rod after passing the wire wheel, and a connection portion of the rope and the lifting rod is located between the wire wheel and the limit block.

By adopting the above technical solution, when the support rod needs to be pushed, the lifting rod will be driven to descend to pull the rope, so that the movable end of the reinforcing rod moves towards the fixing end. The movable end is detached from the sliding rail after shortening of the reinforcing rod, so that the reinforcing rod doesn't tend to interfere the movement of the support rod.

When the connection portion of the support rod and the sliding rail is required to be reinforced, the lifting rod is driven to rise, to drive the movable end to depart from the fixing end by the elastic driving component, so that the reinforcing rod is elongated. The movable end abuts against the sliding rail under the elastic driving component, to stably support the support rod, which improves the strength of the connection portion of the support rod and the sliding rail, and in turn improves the stability of the whole limit device for luggage.

Optionally, the reinforcing rod includes a stationary sleeve and a slidable sleeve slidably connected to the stationary sleeve, the stationary sleeve is fixedly connected to the support rod and in communication with an inner cavity of the support rod; the rope passes through the stationary sleeve and the slidable sleeve, an end of the slidable sleeve departing from the support rod is fixedly connected with an abutting block, the second end of the rope is fixedly connected to the abutting block, and the abutting block is configured to abut against the sliding rail.

By adopting the above technical solution, the rope extends in the stationary sleeve and the slidable sleeve, the rope is not easy to be interfered by an external structure of the reinforcing rod, which improves the stability of the rope during its movement.

Optionally, a guiding ring is fastened in the support rod, and the lifting rod extends slidably through the guiding ring.

By adopting the above technical solution, the guiding ring guides the sliding of the lifting rod, which improves the lifting stability of the lifting rod.

Optionally, an elastic tensioning component is connected between the wire wheel and the guiding ring, and an elastic coefficient of the elastic driving component is greater than an elastic coefficient of the elastic tensioning component.

By adopting the above technical solution, the reinforcing rod is elongated till the movable end abuts against the sliding rail, if the lifting rod does not reach the highest position, the rope will be slack if the lifting rod continues to rise. At this moment, the rope is tensioned by the elastic tensioning component, so that the rope is always in a tensioning state. That is, when the lifting rod rises, the elastic driving component is elongated at first, and then the elastic tensioning component is elongated. When the lifting rod descends, the elastic driving component is compressed, and then the elastic tensioning component is compressed. Therefore, with the elastic tensioning component can a possibility that the rope tends to be slack due to a processing error be avoided, which improves the work stability of the transmission assembly.

Optionally, two sliding rails are provided parallel to each other, and two support rods are provided, each of the two sliding rails corresponds to a respective one of the two support rods, and the limit rod is connected between the two support rods.

By adopting the above technical solution, two ends of the limit rod are supported by the two support rods, which can improve the stability of the limit rod.

In summary, at least one of beneficial technical effects is realized:

1. The lifting rod can be locked at different height positions by pressing the pressing block with the help of the height switching assembly, which can improve the convenience for adjusting the position of the limit rod.

2. It is convenient to adjust and lock the support rod at different height positions through the cooperation between the first limit board, the second limit board, the driving block and the bump.

3. The support rod, the transmission assembly and the reinforcing rod are cooperated with each other, so that the reinforcing rod is detached from the sliding rail when the support rod is unlocked, and abutment of the reinforcing rod against the sliding rail is improved when the support rod is locked. Therefore, it can not only ensure the stability of the whole limit device for luggage, but also further improve the convenience for adjusting the position of the limit rod.

4. The transmission assembly includes the wire wheel and the rope, the rope is pulled or released via rising or descending of the lifting rod, in combination with the cooperation of the elastic driving component, the length of the reinforcing rod can be easily adjusted depending on the height of the lifting rod.

5. The elastic tensioning component is provided to avoid the possibility that the rope tends to be slack due to the processing error, which improves the work stability of the transmission assembly.

DETAILED DESCRIPTION

It needs to be illustrated that, when a component is "fastened on" or "connected to" the other component, or the like, it may be directly located on the other component or there is an intermediate component. Terms, such as "vertical", "horizontal", "up", "down", and the like, used in the present application are referred to positional relationships depicted in the accompanying drawings, which are not the unique expression of the embodiment.

The present application will be further described in detail below in combination with the FIGS. 1-15.

Embodiment 1

The embodiment 1 of the present application discloses a vehicle trunk mat with limit device for luggage.

Figure 1:
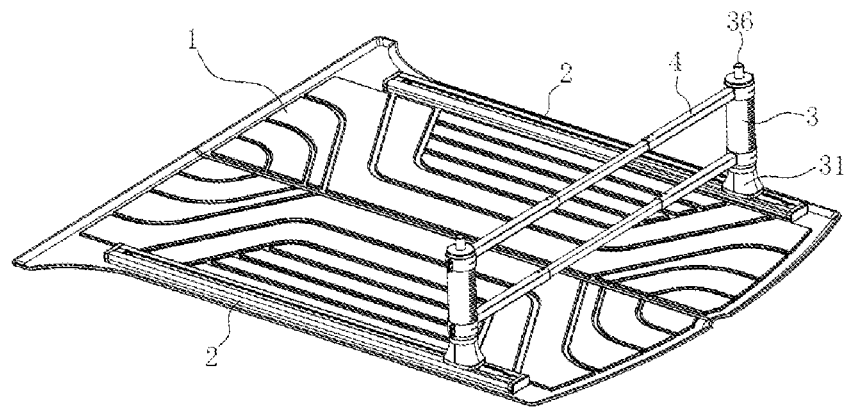
FIG. 1 is a schematic view of the overall structure of a vehicle trunk mat with limit device for luggage according to Embodiment 1 of the present application.

Referring to FIG. 1, the vehicle trunk mat with limit device for luggage includes a luggage mat 1 configured for lying in the vehicle trunk. A top surface of the luggage mat 1 has a plurality of non-skid patterns. When the luggage is placed on the luggage mat 1, the possibility of waggle of the luggage can be reduced by the non-slip patterns.

The described structural stated below are all the states after the luggage mat 1 is laid in the vehicle trunk.

Referring to FIG. 1, the luggage mat 1 is fixedly connected with two sliding rails 2 parallel to each other. After the luggage mat 1 is laid in the vehicle trunk, a length direction of the sliding rail 2 is parallel to a driving direction of the vehicle.

Figure 2:
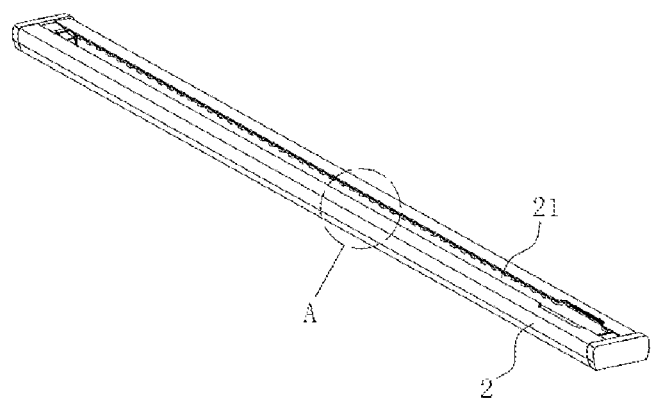
FIG. 2 is a schematic view of the structure of a sliding rail according to Embodiment 1 of the present application.
Figure 3:
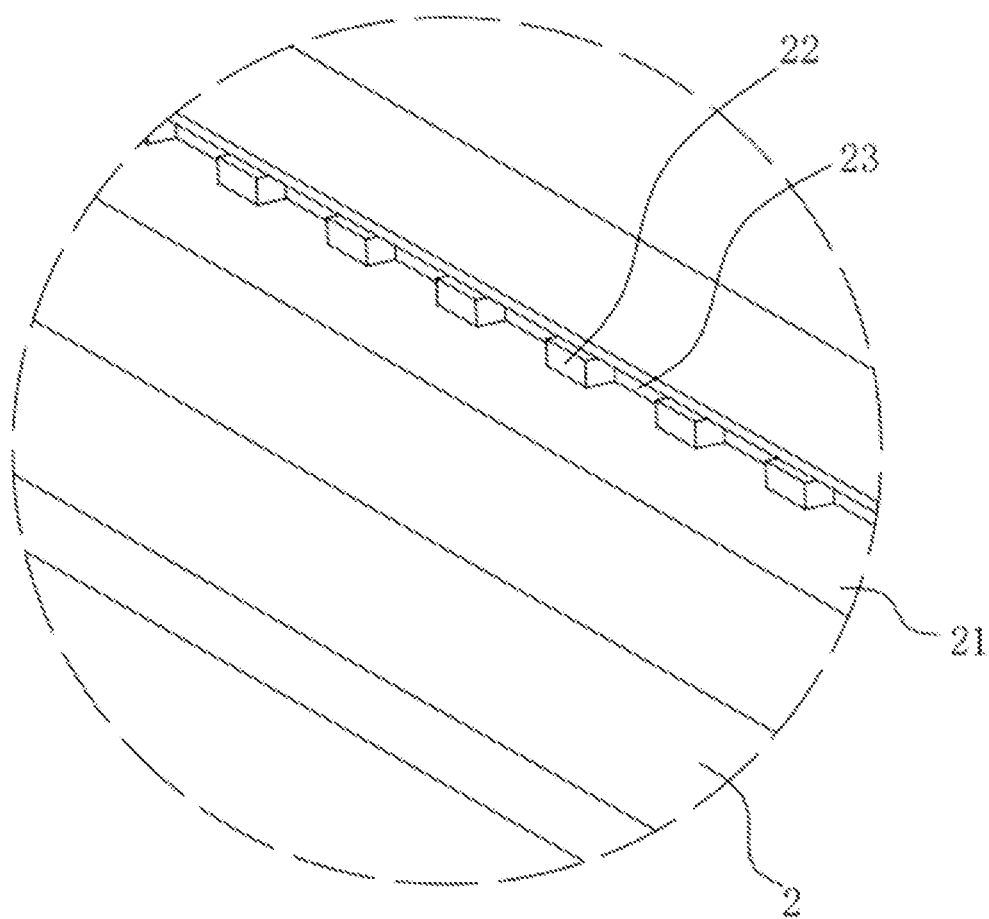
FIG. 3 is an enlarged view of portion A in FIG. 2.

Referring to FIGS. 2-3, the sliding rail 2 is configured with a sliding groove 21 along its length direction, and a baffle 22 above the sliding groove 21 is provided at the top surface of the sliding rail 2. The baffle 22 is configured with a plurality of limit grooves 23 along the length direction of the sliding rail 2, the plurality of limit grooves are in communication with the sliding groove 21.

Figure 4:
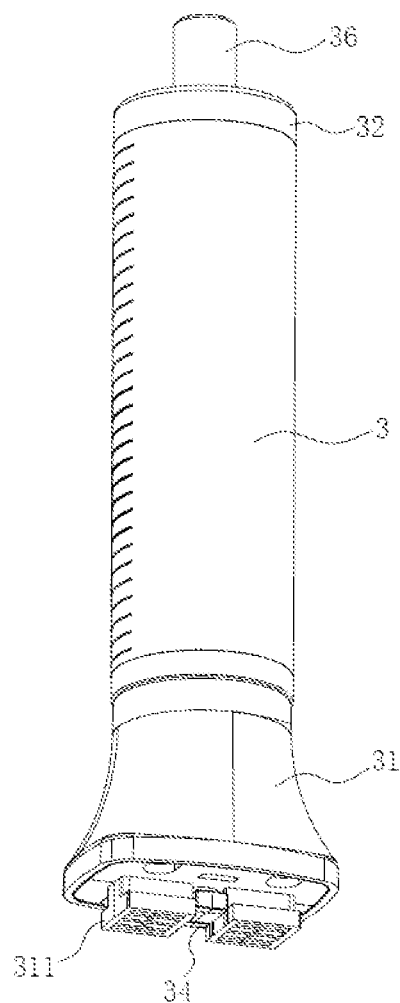
FIG. 4 is a schematic view of the structure of a support rod according to Embodiment 1 of the present application.

Referring to FIG. 1 and FIG. 4, the top surface of the sliding rail 2 is slidably provided with a support rod 3. A bottom of the support rod 3 is fixedly engaged with a sliding base 31, a bottom of the sliding base 31 is fixedly connected with a T-shaped sliding block 311 slidably provided in the sliding groove 21. After the luggage mat 1 is laid in the vehicle trunk, the support rod 3 extends vertically.

Referring to FIG. 1, a limit rod 4 is fixedly connected between the two support rods 3, the limit rod 4 extends horizontally. In order to improve a limit effect of the luggage by the limit rod 4 when the luggage waggles, two limit rods 4 are provided.

Figure 5:
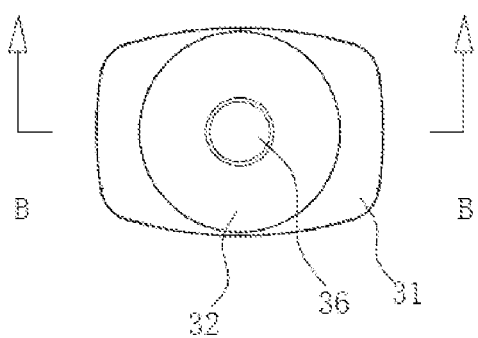
FIG. 5 is a top view of FIG. 4.
Figure 6:
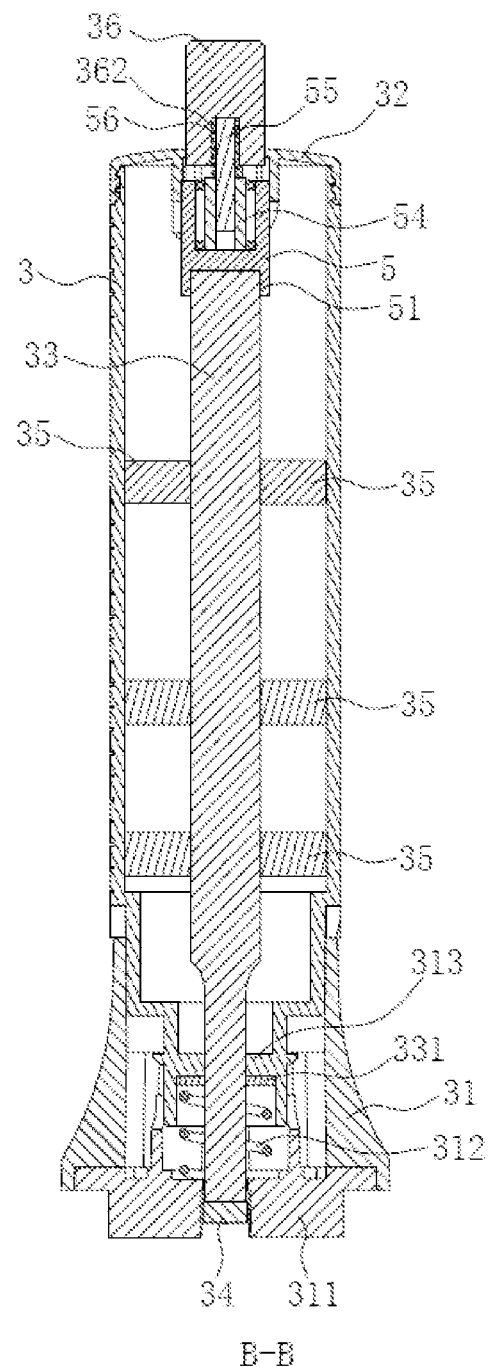
FIG. 6 is a sectional view taken along B-B in FIG. 5.

Referring to FIGS. 5-6, the support rod 3 is a hollow sleeve, and a lifting rod 33 coaxially extends in the support rod 3. In order to improve the stability of the lifting rod 33 during a lifting process, a plurality of guiding rings 35 are fixedly arranged in the support rod 3, and the lifting rod 33 extends slidably through the guiding rings 35. The bottom of the lifting rod 33 is fixedly connected with a limit block 34, which can be inserted into the limit groove 23 during the lifting process, thereby a horizontal movement of the limit block 34 is limited by the baffle 22, so that the support rod 3 is locked. An elastic jacking component 312 is mounted in the sliding base 31, and the elastic jacking component 312 is designed as a pressure spring. The lifting rod 33 is fixedly connected with a limit ring 331, and the top of the elastic jacking component 312 abuts against a lower surface of the limit ring 331. The sliding base 31 is fastened with a limit bulge 313 for limiting the rising height of the limit ring 331.

Referring to FIG. 6, the top of the support rod 3 is in threaded connection with a sealing cover 32, and a pressing block 36 extends slidably through the sealing cover 32 vertically. A height switching assembly is connected between the pressing block 36 and the lifting rod 33, to lock the lifting rod 33 at different height positions, thereby controlling the limit block 34 to insert into or depart from the limit groove 23 (referring to FIG. 3).

Referring to FIG. 6, the height switching assembly includes a linkage 5, wherein the pressing block 36, the linkage 5, the lifting rod 33 and the support rod 3 are arranged coaxially. A lower end surface of the linkage 5 is configured with a slot 51, the top of the lifting rod 33 is inserted into the slot 51, the linkage 5 can rotate relative to the lifting rod 33. When the pressing block 36 is pressed downward, the pressing block 36 can abut against the linkage 5 to drive it to descend, and the linkage 5 drives the lifting rod 33 to descend.

Figure 7:
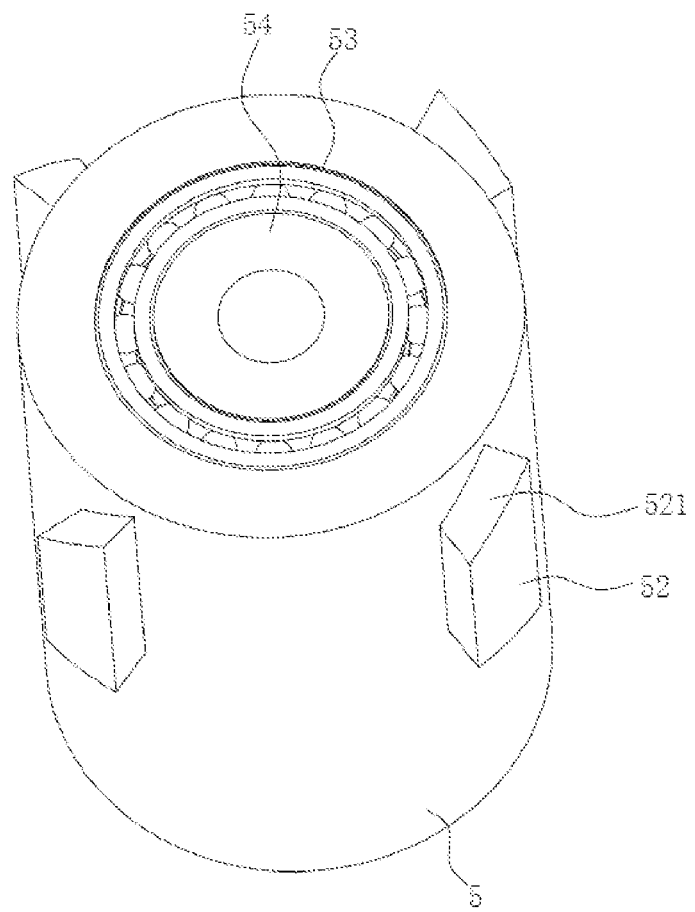
FIG. 7 is a schematic view of the structure of a linkage according to Embodiment 1 of the present application.

Referring to FIG. 7, an outer circumferential wall of the linkage 5 is fastened with a plurality of bumps 52 in the circumferential direction of the linkage 5. The top of the bump 52 has an abutting helicoid 521.

Figure 8:
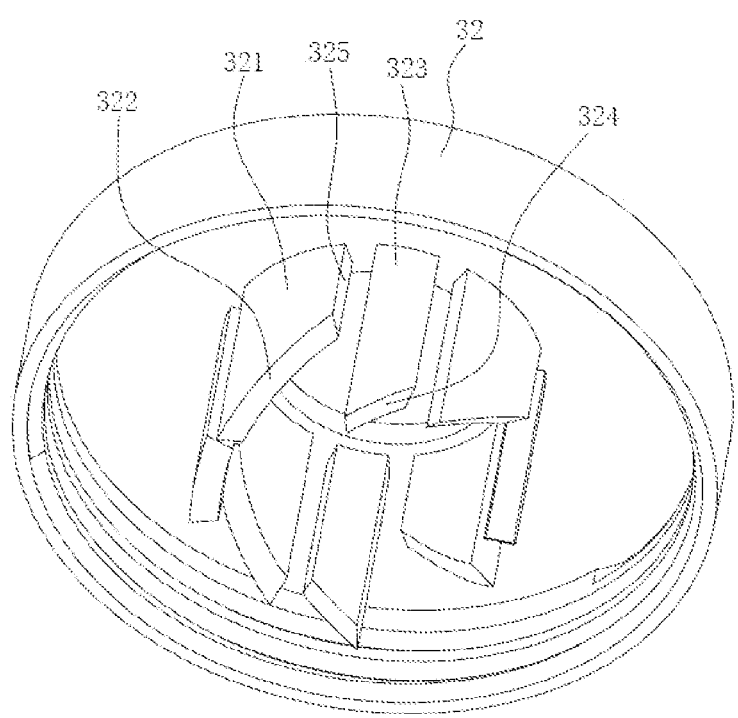
FIG. 8 is a schematic view of the structure of a sealing cover, a first limit board and a second board according to Embodiment 1 of the present application.

Referring to FIG. 8, a plurality of first limit boards 321 and a plurality of second limit boards 323 are fastened in the sealing cover 32. The first limit boards 321 and the second limit boards 323 are alternately distributed around an axis of the linkage 5. The first limit boards 321 and the second limit boards 323 fit into the outer circumferential wall of the linkage 5. A slideway 325 is defined between the first limit board 321 and the second limit board 323. A length direction of slideway 325 is parallel to the axis of the linkage 5 (referring to FIG. 6). A bottom of the first limit board 321 is configured with a first limit helicoid 322, while a bottom of the second limit board 323 is configured with a second limit helicoid 324, and the abutting helicoid 521 (referring to FIG. 7), the first limit helicoid 322 and the second limit helicoid 324 are inclined in a same inclination direction. A width of the first limit board 321 is greater than that of the second limit board 323, a top of the first limit helicoid 322 is higher than that of the second limit helicoid 324, and the bottom of the first limit helicoid 322 and the bottom of the second limit helicoid are at a same level.

Figure 9:
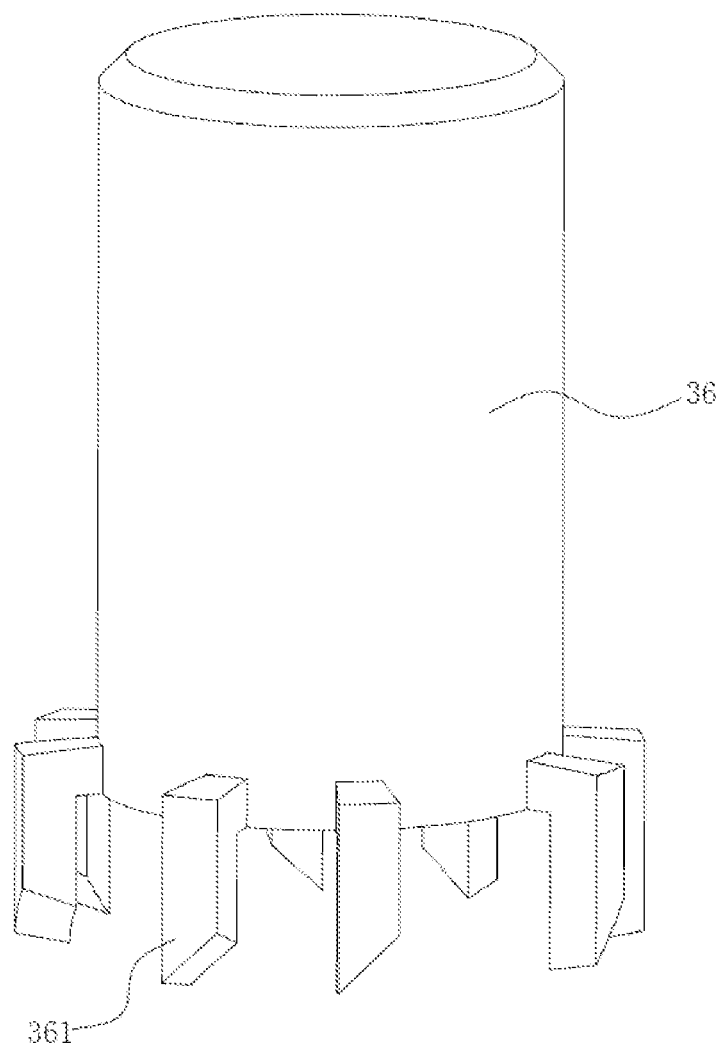
FIG. 9 is a schematic view of the structure of a pressing block and a driving block according to Embodiment 1 of the present application.
Figure 10:
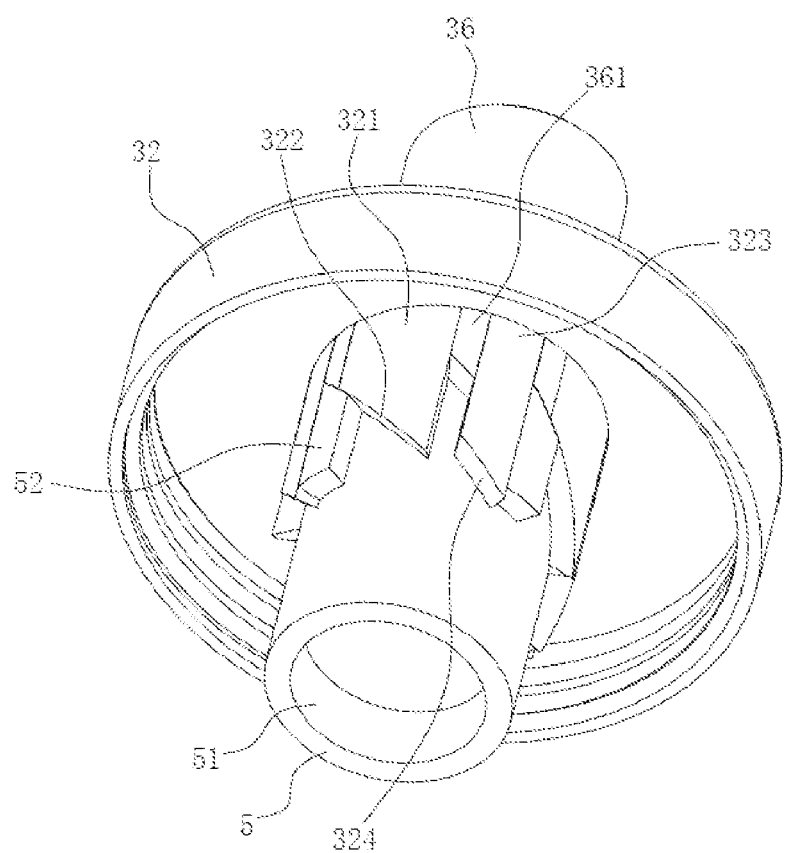
FIG. 10 shows schematically a state of the linkage at a high position according to Embodiment 1 of the present application.

Referring to FIGS. 8-10, a bottom of the pressing block 36 is fixedly connected with a plurality of ring-distributed driving blocks 361. Each of the driving blocks 361 corresponds to a respective one of the slideways 325, and is arranged in the respective one of the slideways 325.

Referring to FIG. 10, it illustrates a state when the linkage 5 is at a high position.

Figure 11:
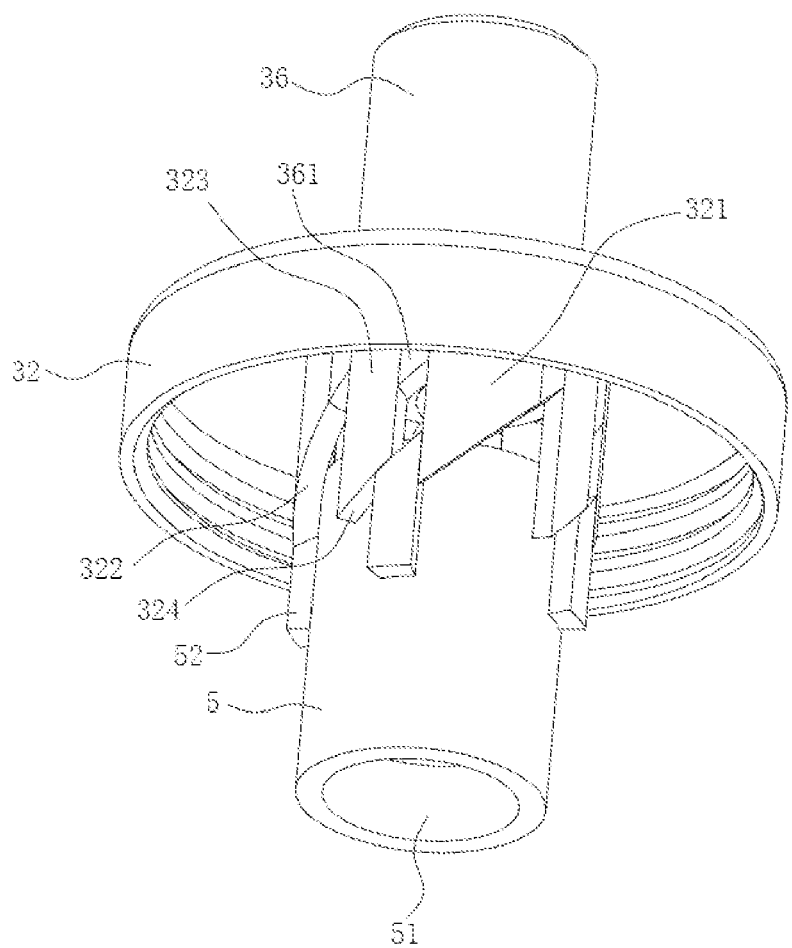
FIG. 11 shows schematically a state of the linkage at a lower position according to Embodiment 1 of the present application.

Referring to FIG. 11, it illustrates a state when the linkage 5 is at a low position.

When the lifting rod 33 is at the high position, the abutting helicoid 521 of the bump 52 fits into the first limit helicoid 322, and the bump 52 fits into a sidewall of the second limit board 323 under the elastic jacking component 312. At the moment, if the pressing block 36 is pressed downward, the pressing block 36 drives the driving blocks 361 to descend, and then the driving block 361 abuts against the abutting helicoid 521 to drive the bump 52 to descend, wherein the bump 52 moves downward under limitation of the sidewall of the second limit board 323, and the bump 52 drives the linkage 5 to move downward. When the bump 52 is detached from the second limit board 323, the linkage 5 rotates under a continuous pushing force from the driving block 361.

The bump 52 of the linkage 5 fits into the second limit helicoid 324 and slides upward along the second limit helicoid 324 under the elastic jacking component 312. The bump 52 drives the linkage 5 to slide upward and rotate till the bump 52 abuts against the sidewall of the first limit board 321, at this moment the lifting rod 33 is at the low position.

Similarly, when the lifting rod 33 is at the low position, the lifting rod 33 can be switched to the high position through the height switching assembly by pressing the pressing block 36 downward.

Referring to FIGS. 6-7, in order to avoid the interference in the movement of the bump 52 by the driving block 361 after the pressing block 36 is pressed, the pressing block 36 must be pulled upward to reset the driving block 361, which is inconvenient in operation. In order to reset the pressing block 36 easily, a top end surface of the linkage 5 is configured with a mounting groove 53, a rotating sleeve 54 is provided in the mounting groove 53. The rotating sleeve 54 is rotationally connected to the linkage 5 via a bearing. A sliding column 55 is slidably inserted into the rotating sleeve 54, a bottom of the pressing block 36 is configured with an accommodation groove 362, and the top end of the linkage 5 is inserted into the accommodation groove 362 and fixedly connected to the pressing block 36. A elastic reset component 56 is sleeved on the outside of the sliding column 55, and the elastic reset component 56 is configured as a pressure spring. A first end of the elastic reset component 56 is inserted in the accommodation groove 362, while a second end thereof abuts against the rotating sleeve 54. Therefore, the elastic reset component 56 can drive the pressing block 36 to reset upward after the pressing block 36 is pressed and then released.

An implementation principle for Embodiment 1 of the present application is as follows. In the primary state, the abutting helicoid 521 of the bump 52 abuts against the first limit helicoid 322, and the bump 52 fits into the sidewall of the second limit board 323. The lifting rod 33 is located at the high position, and the limit block 34 is located in the limit groove 23, so that the support rod is in a locking state.

When the support rod 3 must be unlocked to adjust its position, the pressing block 36 is pressed downward to drive the driving blocks 361 to descend. When the driving block 361 abuts against the abutting helicoid 521, the bump 52 is driven to descend, the bump 52 moves downward under limitation of the sidewall of the second limit board 323 and drives the linkage 5 to move downward, and in turn the linkage 5 drives the lifting rod 33 to descend. When the bump 52 is detached from the second limit board 323, the linkage 5 rotates due to a continuous downward pushing force of the driving block 361. After the pressing block 36 is released, it returns upward due to an elastic force of the elastic reset component 56 to detach from the linkage 5, so that the movement of the bump 52 is not easily interfered by the driving block 361.

The bump 52 on the linkage 5 fits into the second limit helicoid 324 and slides upward along the second limit helicoid 324 under the elastic jacking component 312, and the bump 52 drives the linkage 5 to slide upward and rotate, till the bump 52 abuts against the sidewall of the first limit board 321. At this moment, since a rising height of the linkage 5 is less than a falling height thereof, both the linkage 5 and the lifting rod 33 are at the low position, such that the limit block 34 is detached from the limit groove 23 to unlock the support rod 3. Therefore, when the support rod 3 is pushed to move, its position can be conveniently adjusted without remaining a pressing action.

When the support rod 3 needs to be locked again, the pressing block 36 is pressed downward again to drive the driving blocks 361 to descend. When the driving block 361 abuts against the abutting helicoid 521, the bump 52 is driven to descend, which moves downward under limitation of the sidewall of the first limit board 321 and drives the linkage 5 to move downward.

When the bump 52 is detached from the first limit board 321, the linkage 5 rotates due to the continuous downward pushing force of the driving block 361. After releasing the pressing block 36, it restores upward due to the elastic force of the elastic reset component 56, such that the pressing block 36 is detached from the linkage 5, thereby the movement of the bump 52 is not easy to be interfered by the driving block 361.

The bump 52 on the linkage 5 fits into the second limit helicoid 324 and slides upward along the second limit helicoid 324 under the elastic jacking component 312. The bump 52 drives the linkage 5 to slide upward and rotate, till the bump 52 abuts against the sidewall of the second limit board 323. At this moment, both the linkage 5 and the lifting rod 33 are at the high position, thereby the limit block 34 is inserted into the limit groove 23 to lock the support rod 3 again.

Therefore, the position of the limit rod 4 is convenient to be adjusted by adopting the technical solution in Embodiment 1 of the present application.

Embodiment 2

The embodiment 2 of the present application discloses a vehicle trunk mat with limit device for luggage. The embodiment 2 differs from the embodiment 1 in that a reinforcing rod 6 and a transmission assembly 7 are added.

Figure 12:
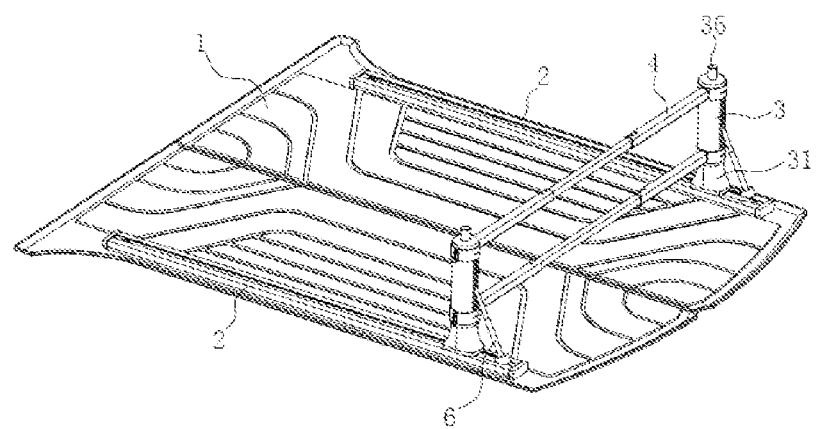
FIG. 12 is a schematic view of the overall structure of a vehicle trunk mat with limit device for luggage according to Embodiment 2 of the present application.

Referring to FIG. 12, the center of gravity of the support rod 3 is relative higher due to its bigger height. When the vehicle is accelerated or braked suddenly, Waggle of the luggage is limited by the limit rod 4. A push force of the luggage is born by the limit rod 4 and the support rod 3, such that a connection portion of the support rod 3 and the sliding rail 2 tends to break off. Therefore, a reinforcing rod 6 is additionally provided between the sliding rail 2 and the support rod 3 to improve the structural stability.

Figure 13:
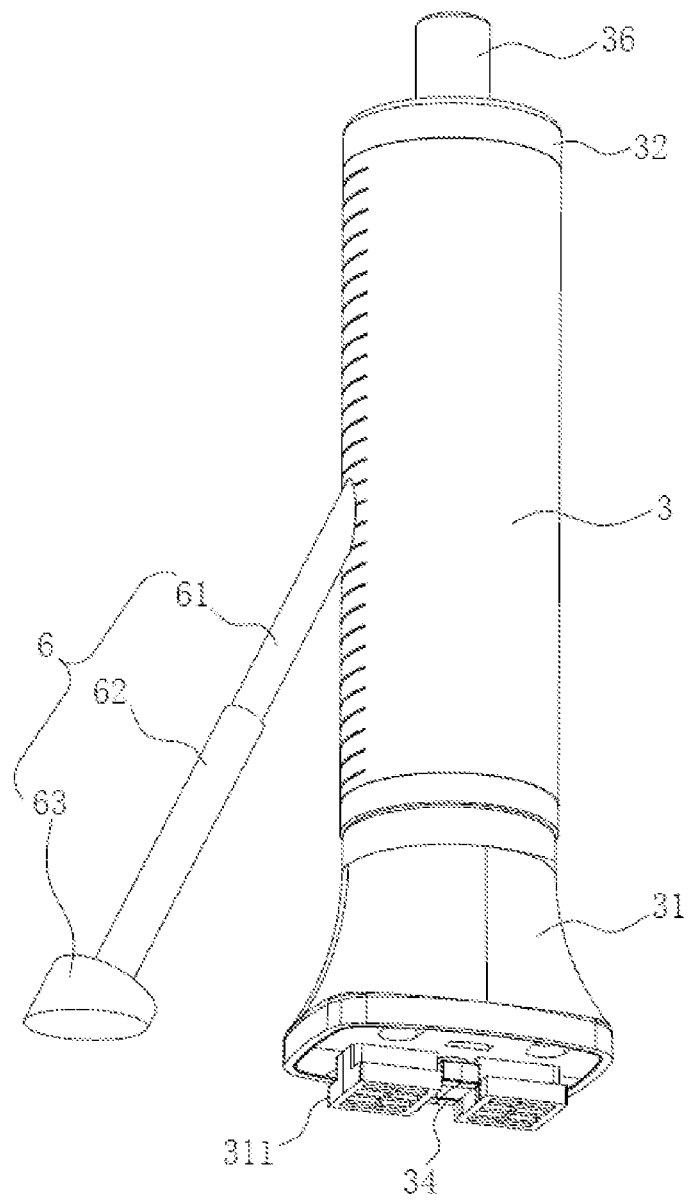
FIG. 13 is schematic view of the structure of a support rod and a reinforcing rod according to Embodiment 2 of the present application.

Referring to FIG. 13, the reinforcing rod 6 includes a stationary sleeve 61 and a slidable sleeve 62, the slidable sleeve 62 is sleeved on the stationary sleeve 61, and the stationary sleeve 61 is slidably fitted with the slidable sleeve 62. An end of the stationary sleeve 61 out of the slidable sleeve 62 acts as a fixing end of the reinforcing rod 6 and is fixedly connected to an outer circumferential wall of the support rod 3. The stationary sleeve 61 is in communication with an inner cavity of the support rod 3. An end of the slidable sleeve 62 departing from the support rod 3 is fixedly connected with an abutting block 63, which acts as a movable end of the reinforcing rod 6.

Figure 14:
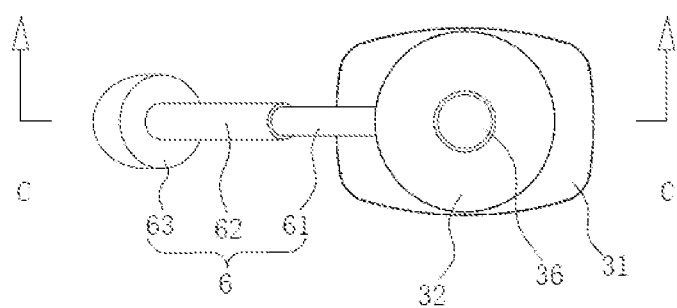
FIG. 14 is a top view of FIG. 13.
Figure 15:
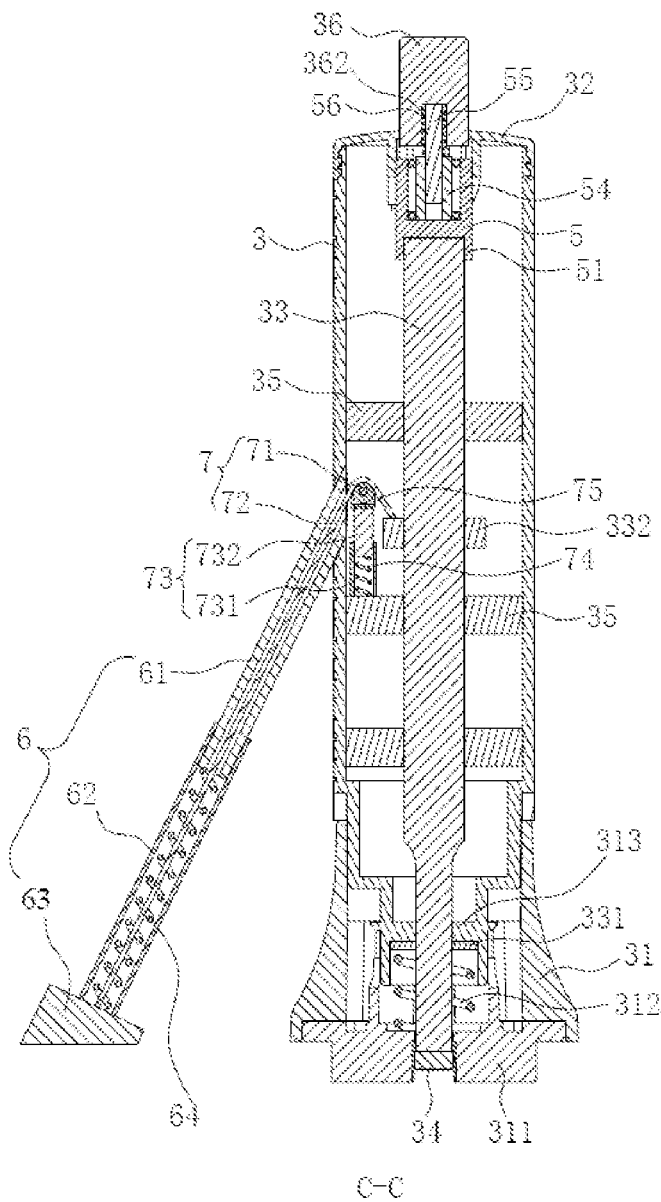
FIG. 15 is a sectional view taken along C-C of FIG. 14.

Referring to FIGS. 14-15, an elastic driving component 64 extends in the slidable sleeve 62, the elastic driving component 64 is configured as a pressure spring. The elastic driving component 64 is squeezed between the stationary sleeve 61 and the abutting block 63. During limiting waggle of the luggage, the elastic driving component 64 drives the abutting block 63 to abut against the sliding rail 2, so that the reinforcing rod 6 supports the support rod 3, which improves the stability of the connection portion between the support rod 3 and the sliding rail 2.

Referring to FIG. 15, when the position of the support rod 3 shall be adjusted depending on the size of the luggage, the lifting rod 33 must be adjusted to the low position, so that the limit block 34 is detached from the limit groove 23 to unlock the support rod 3. When the support rod 3 is pushed to move, in order to prevent the support rod 3 from getting stuck by the reinforcing rod 6, the abutting block 63 must retract upward to detach from the sliding rail 2. The transmission assembly 7 is provided to solve this problem.

Referring to FIG. 15, the transmission assembly 7 is provided in the support rod 3. When the lifting rod 33 descends, the transmission assembly 7 drives the reinforcing rod 6 to retract, and when the lifting rod 33 rises, the transmission assembly 7 drives the reinforcing rod 6 to elongate to abut against the sliding rail 2 (referring to FIG. 12).

Referring to FIG. 15, the transmission assembly 7 includes a wire wheel 71 and a rope 72, an upper surface of one guiding ring 35 is fixedly connected with a telescopic sleeve 73, which extends vertically. The telescopic sleeve 73 includes a positioning sleeve 731 and a slidable rod 732, the positioning sleeve 731 is fixedly connected to the guiding ring 35, and the slidable rod 732 extends slidably through the positioning sleeve 731. A top end of the slidable rod 732 is fixedly connected with a mounting seat 75, the wire wheel 71 is rotationally connected to the mounting seat 75. An elastic tensioning component 74 is mounted in the positioning sleeve 731, the elastic tensioning component 74 is configured as a pressure spring, and is squeezed between the guiding ring 35 and the slidable rod 732.

Referring to FIG. 15, the rope 72 extends through the stationary sleeve 61 and the slidable sleeve 62, and the rope 72 is wound around the wire wheel 71. The lifting rod 33 is fixedly connected with a connecting block 332. A first end of the rope 72 is fixedly connected to the abutting block 63, and a second end thereof is fixedly connected to the connecting block 332 after passing the wire wheel 71. The wire wheel 71 is positioned above the stationary sleeve 61.

Referring to FIG. 15, the elastic coefficient of the elastic driving component 64 is greater than that of the elastic tensioning component 74.

When the lifting rod 33 descends, the rope 72 is pulled by the lifting rod 33 via the connecting block 332. The wire wheel 71 is pressed by the rope 72 to descend at first, such that the elastic tensioning component 74 is compressed. When the elastic tensioning component 74 is compressed by a distance, the abutting block 63 is pulled by the rope 72, so that the abutting block 63 moves upward to compress the elastic driving component 64.

When the lifting rod 33 rises, the elastic driving component 64 is driven to elongate at first. When the abutting block 63 abuts against the sliding rail 2, the elastic tensioning component 74 is elongated, so that the wire wheel 71 rises.

The lifting height of the lifting rod 33 is so designed, that, when the lifting rod 33 is at the highest position, namely the high position, the abutting block 63 directly abuts against the sliding rail 2 precisely, which is the ideal design. However, there are always error by a structural design. In order to design a structure conveniently and ensure the tight abutment of the abutting block 63 against the sliding rail 2, the abutting block 63 can be designed to abut against the sliding rail 2 at first, and then the lifting rod 33 continues to rise by a short distance to reach the highest position. At this moment, the rope 72 will be slack without the elastic tensioning component 74, so that the rope 72 tends to fall off the wire wheel 71. Therefore, the elastic tensioning component 74 is provided to keep the rope 72 always in a tensioning state, which can ensure a stabile work of the transmission assembly 7, while the whole limit device can be allowed to have a certain design error, thereby saving a structural design cost.

The implementation principle for Embodiment 2 of the present application is as follows. In the primary state, the lifting rod 33 is at the high position, and the limit block 34 is positioned in the limit groove 23, so that the support rod 3 is in a lock state, the movable end of the reinforcing rod 6 abuts against the sliding rail 2, and the support rod 3 is supported by the reinforcing rod 6. When the support rod 3 is to be unlocked to adjust the position of the support rod 3, the pressing block 36 can be pressed downward to drive the driving block 361 to descend. When the driving block 361 abuts against the abutting helicoid 521, the bump 52 is driven to descend, wherein the bump 52 moves downward under the limitation of the sidewall of the second limit board 323 and drives the linkage 5 to move downward, and in turn the linkage 5 drives the lifting rod 33 to descend.

When the lifting rod 33 descends, the rope 72 is pulled by the lifting rod 33 via the connecting block 332. The wire wheel 71 is pressed by the rope 72 to descend at first, such that the elastic tensioning component 74 is compressed. When the elastic tensioning component 74 is compressed by a distance, the abutting block 63 is pulled by the rope 72, so that the abutting block 63 moves upward to compress the elastic driving component 64, such that the abutting block 63 is detached from the sliding rail 2. When the support rod 3 is pushed to slide along the sliding rail 2, the reinforcing rod 6 doesn't tend to affect the sliding of the support rod 3, which further improves the convenience for adjusting the positions of the support rod 3 and the limit rod 4.

After the positions of the support rod 3 and the limit rod 4 have been adjusted, the support rod 3 must be locked again. Therefore, the pressing block 36 must be pressed downward again, such that the lifting rod 33 descends at first and then rises. A rising height of the lifting rod 33 is greater than a falling height thereof, so that the lifting rod 33 is switched to a state at the high position. At this moment, the limit block 34 is inserted into the limit groove 23 to lock the support rod 3 again.

When the lifting rod 33 rises, it drives the elastic driving component 64 to elongate at first. When the abutting block 63 abuts against the sliding rail 2, the support rod 3 is supported by the reinforcing rod 6, which can improve the strength of connection portion between the support rod 3 and the sliding rail 2, thereby further improving the stability of the whole limit device.

When the abutting block 63 abuts against the sliding rail 2, the elastic tensioning component 74 is elongated, so that the wire wheel 71 rises and the rope 72 is tensioned.

Therefore, on the basis of the improved strength of the support rod 3, the position of the limit rod 4 can be conveniently adjusted by adopting the technical solution in Embodiment 2 of the present application.

The above are the preferred embodiments of the present application, which are not intended to limit the protection scope of the present application. Therefore, all equivalent changes made according to the structure, shape and principle of the present application should be covered within the protection scope of the present application.

REFERENCE SIGNS LIST 1 luggage mat
2 sliding rail
21 sliding groove
22 baffle
23 limit groove
3 support rod
31 sliding base
311 T-shaped sliding block
312 elastic jacking component
313 limit bulge
32 sealing cover
321 first limit board
322 first limit helicoid
323 second limit board
324 second limit helicoid
325 slideway
33 lifting rod
332 connecting block
34 limit block
35 guiding ring
36 pressing block
361 driving block
362 accommodation groove
4 limit rod
5 linkage
51 slot 52 bump
521 abutting helicoid
53 mounting groove
54 rotating sleeve
55 sliding column
56 elastic reset component
6 reinforcing rod
61 stationary sleeve
62 slidable sleeve
63 abutting block
64 elastic driving component
7 transmission assembly
71 wire wheel
72 rope
73 telescopic sleeve
731 positioning sleeve
732 slidable rod
74 elastic tensioning component
75 mounting seat

What is claimed is:

1. A vehicle trunk mat with limit device for luggage, comprising:
a luggage mat configured for lying in a vehicle trunk;
a sliding rail fastened on the luggage mat, the sliding rail is configured with a plurality of limit grooves spaced apart from each other;
a support rod slidably connected to the sliding rail, the support rod is perpendicular to the luggage mat and is connected with a limit rod parallel with the luggage mat, the limit rod is spaced from the luggage mat at a distance, a lifting rod extends slidably in the support rod, a first end of the lifting rod facing the sliding rail is fastened with a limit block, and a second end of the support rod departing from the sliding rail is provided with a pressing block; and
a height switching assembly connected between the pressing block and the lifting rod, when the pressing block is pressed, the height switching assembly is configured for switching between different height positions of the lifting rod, so that the limit block is inserted into or detached from one of the limit grooves.

2. The vehicle trunk mat with limit device for luggage according to claim 1, wherein the height switching assembly comprises a linkage sleeved on the lifting rod, the linkage is positioned between the pressing block and the lifting rod, the linkage is configured to rotate relative to the lifting rod, an outer circumferential wall of the linkage is fixedly connected with a plurality of bumps arranged at intervals, and an end of each of the bumps facing the pressing block has an abutting helicoid;
a top of the support rod is fastened with a plurality of first limit boards and a plurality of second limit boards, the first limit boards and the second limit boards are alternately arranged in a circumferential direction of the linkage, an end of each of the first limit boards facing the lifting rod is configured with a first limit helicoid, an end of each of the second limit boards facing to the lifting rod is configured with a second limit helicoid, a top end of the first limit helicoid is higher than a top end of the second limit helicoid, the abutting helicoid is configured to fit into the first limit helicoid or the second limit helicoid, a slideway parallel to an axis of the lifting rod is formed between each of the first limit boards and a respective one of the second limit boards, a driving block is provided in each of the slideways, the driving blocks are fastened at a bottom of the pressing block, and each of the driving blocks is adaptive for pushing the abutting helicoid; and
an elastic jacking component for driving the lifting rod to move upward is provided at a bottom of the support rod.

3. The vehicle trunk mat with limit device for luggage according to claim 2, wherein an elastic reset component is connected between the lifting rod and the pressing block, and the elastic reset component is configured for driving the pressing block to move in a direction departing from the lifting rod.

4. The vehicle trunk mat with limit device for luggage according to claim 2, wherein the top of the support rod is detachably connected with a sealing cover, the pressing block extends slidably through the sealing cover, and the first limit boards and the second limit boards are fixedly connected to the sealing cover.

5. The vehicle trunk mat with limit device for luggage according to claim 1, further comprising:
a reinforcing rod configured as a telescopic rod, the reinforcing rod is connected with an elastic driving component for driving the reinforcing rod to elongate, a first end of the reinforcing rod is configured as a fixing end and fixedly connected to the support rod, a second end of the reinforcing rod is configured as a movable end, and when the limit block is located in one of the limit grooves, the movable end abuts against the sliding rail by an elastic force of the elastic driving component; and
a transmission assembly connected between the lifting rod and the reinforcing rod, when the lifting rod descends, the transmission assembly drives the reinforcing rod to shorten, so that the reinforcing rod is detached from the sliding rail.

6. The vehicle trunk mat with limit device for luggage according to claim 5, wherein the transmission assembly comprises a wire wheel and a rope, the wire wheel is rotationally connected in the support rod, the rope is wound around the wire wheel, a first end of the rope is fixedly connected to the lifting rod, a second end of the rope is fixedly connected to the movable end of the reinforcing rod after passing the wire wheel, and a connection portion of the rope and the lifting rod is located between the wire wheel and the limit block.

7. The vehicle trunk mat with limit device for luggage according to claim 6, wherein the reinforcing rod comprises a stationary sleeve and a slidable sleeve slidably connected to the stationary sleeve, the stationary sleeve is fixedly connected to the support rod and in communication with an inner cavity of the support rod, the rope extends in the stationary sleeve and the slidable sleeve, an end of the slidable sleeve departing from the support rod is fixedly connected with an abutting block, the second end of the rope is fixedly connected to the abutting block, and the abutting block is configured to abut against the sliding rail.

8. The vehicle trunk mat with limit device for luggage according to claim 6, wherein a guiding ring is fastened in the support rod, and the lifting rod extends slidably through the guiding ring.

9. The vehicle trunk mat with limit device for luggage according to claim 8, wherein an elastic tensioning component is connected between the wire wheel and the guiding ring, and an elastic coefficient of the elastic driving component is greater than an elastic coefficient of the elastic tensioning component.

10. The vehicle trunk mat with limit device for luggage according to claim 1, wherein two sliding rails are provided parallel to each other, and two support rods are provided, each of the two sliding rails corresponds to a respective one of the two support rods, and the limit rod is connected between the two support rods.

\* \* \* \* \*